United States Patent
Kiukkonen et al.

(10) Patent No.: US 10,694,503 B2
(45) Date of Patent: Jun. 23, 2020

(54) TETHERING OVER A WIRELESS COMMUNICATION CHANNEL

(71) Applicant: Nokia Corporation, Espoo (FI)

(72) Inventors: Niko Kiukkonen, Veikkola (FI); Arto Palin, Viiala (FI); Jukka Pekka Reunamaki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/558,799

(22) Filed: Dec. 3, 2014

(65) Prior Publication Data
US 2015/0201444 A1    Jul. 16, 2015

(30) Foreign Application Priority Data
Jan. 14, 2014    (EP) ..................................... 14151055

(51) Int. Cl.
*H04W 72/04*    (2009.01)
*H04W 88/04*    (2009.01)
(Continued)

(52) U.S. Cl.
CPC ..... *H04W 72/0406* (2013.01); *H04L 67/2842* (2013.01); *H04W 4/50* (2018.02); *H04W 76/14* (2018.02); *H04W 88/04* (2013.01)

(58) Field of Classification Search
CPC .......................... G06K 9/00671; H04W 4/026
(Continued)

(56) References Cited

U.S. PATENT DOCUMENTS 7,814,483 B2 * 10/2010 Li .................. H04L 67/2847
                                                   709/231
2002/0177418 A1 * 11/2002 Kido .................. G06F 1/1616
                                                    455/575.1
(Continued)

OTHER PUBLICATIONS

Connection Handover—Technical Specification, NFC Forum, Connection Handover 1.2, Jul. 7, 2010, 27 pages.
(Continued)

*Primary Examiner* — Vladimir Magloire
*Assistant Examiner* — Donald H B Braswell
(74) *Attorney, Agent, or Firm* — Locke Lord LLP (57) ABSTRACT

A technique for tethering over a wireless communication channel is provided. According an example embodiment, the technique comprises exchanging, over a secondary communication channel between a first mobile device and a second mobile device, control information related to a tethering connection provided over a primary communication channel between the first and second mobile devices, and initiating, by the first mobile device, establishment, activation or reactivation of said primary communication channel in response to receiving, via said secondary communication channel, a request to access a resource in a remote network over said tethering connection using a mobile access point functionality provided by the first mobile device. The technique may further comprise the first mobile device initiating downloading of said resource to a local proxy in response to receiving the request to access the resource, thereby downloading at least part of said resource to the local proxy before completion of the establishment, activation or reactivation of the primary communication channel.

17 Claims, 4 Drawing Sheets

(51) Int. Cl.
*H04W 76/14* (2018.01)
*H04L 29/08* (2006.01)
*H04W 4/50* (2018.01)

(58) Field of Classification Search
USPC .................................................. 455/414.2
See application file for complete search history.

(56) References Cited

U.S. PATENT DOCUMENTS

| | | | | |
|---|---|---|---|---|
| 2011/0028085 | A1* | 2/2011 | Waung | H04W 88/04 |
| | | | | 455/7 |
| 2013/0107783 | A1* | 5/2013 | Shaw | H04W 4/06 |
| | | | | 370/312 |
| 2013/0182693 | A1* | 7/2013 | Sperling | H04W 12/06 |
| | | | | 370/338 |
| 2013/0254264 | A1* | 9/2013 | Hankinson | H04L 29/06047 |
| | | | | 709/203 |
| 2014/0250204 | A1* | 9/2014 | Shalunov | H04L 67/02 |
| | | | | 709/217 |
| 2014/0342730 | A1* | 11/2014 | Mulcahy | H04L 67/2847 |
| | | | | 455/426.1 |

OTHER PUBLICATIONS

Extended European Search Report for EP Application No. 14151055. 2, Date of Completion of Search: Jul. 23, 2014, 8 pages.

* cited by examiner

TETHERING OVER A WIRELESS COMMUNICATION CHANNEL

This application claims priority to European patent application number 14151055.2, filed Jan. 14, 2014, the entire contents of which are incorporated herein by reference.

TECHNICAL FIELD

The example and non-limiting embodiments of the present invention relate to tethering over a wireless communication channel.

BACKGROUND

Modern society has adopted wireless communication devices for various purposes, such as connecting users of the wireless communication with other users and/or accessing services and information available in a network, e.g. in the Internet. Wireless communication devices can vary from battery powered handheld devices to stationary household and/or commercial devices utilizing an electrical network as a power source. Due to rapid development of the wireless communication techniques, both a number of devices capable of, or even relying on, wireless communication and a number of areas or locations capable of providing wireless connection has also increased and is expected to continue to increase.

Cellular wireless networks facilitate communication over large geographic areas, and may hence be referred to as (wireless) wide area networks. While cellular wireless networks are widely applied to provide users of mobile devices with a wireless network connection (also) for transmitting and receiving data, e.g. due to cost and capacity issues they may not be appropriate for all data transfer applications.

Short-range wireless communication technologies provide communication solutions that may be applied to alleviate e.g. the cost and capacity issues involved in cellular wireless communication. Examples of short-range wireless technologies include Bluetooth (BT) and Bluetooth Low Energy (BLE), described e.g. in the Bluetooth Specification Version 4.0, Specification Volume 3—Core System Package [Host volume] Part C, Section 11 (publication date 30 Jun. 2010). Further examples of short-range wireless technologies include wireless local area network (WLAN) according to IEEE 802.11 series of standards, Wireless USB, ZigBee (IEEE 802.15.4, IEEE 802.15.4a), and ultra-high frequency radio frequency identification (UHF RFID) technologies. However, wireless access points (or hotspots) serving as connection points to the network for mobile devices relying on short-range wireless communication are available only in certain locations, thereby providing geographically limited means of wireless network access.

Near field communication technologies, such as radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product. In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch can establish an NFC connection that may be used to exchange information, e.g. information that is specific to a connection employing another communications protocol, which information may then be used to create or manage an actual connection employing the other communications protocol, e.g. BT or WLAN.

SUMMARY

According to an example embodiment, an apparatus is provided, the apparatus comprising at least one processor and at least one memory including computer program code for one or more programs, the at least one memory and the computer program code configured to, with the at least one processor, cause the apparatus at least to receive, over a secondary communication channel between the apparatus and a mobile device, control information related to a tethering connection provided over a primary communication channel between the apparatus and the mobile device, wherein said control information comprises one or more requests related to transfer of data over said tethering connection, and to initiate establishment, activation or reactivation of said primary communication channel in response to receiving, via said secondary communication channel, a request to access a resource in a remote network over said tethering connection using a mobile access point functionality provided by the apparatus. The apparatus may be further caused to initiate downloading said resource to a local proxy in response to receiving the request to access the resource, thereby downloading at least part of said resource to the local proxy before completion of the establishment, activation or reactivation of the primary communication channel.

According to another example embodiment, an apparatus is provided, the apparatus comprising at least one processor and at least one memory including computer program code for one or more programs, the at least one memory and the computer program code configured to, with the at least one processor, cause the apparatus at least to transmit, over a secondary communication channel between the apparatus and a mobile device, control information related to a tethering connection provided over a primary communication channel between the apparatus and the mobile device, wherein in the control information comprises a request to access a resource in a remote network over said tethering connection using a mobile access point functionality provided by the mobile device, said request comprising an address identifying said resource and said request arranged to cause the mobile device to initiate establishment, activation or reactivation of said primary communication channel.

According to another example embodiment, a method is provided, the method comprising receiving, by a first mobile device, over a secondary communication channel between the first mobile device and a second mobile device, control information related to a tethering connection provided over a primary communication channel between the first and second mobile devices, wherein said control information comprises one or more requests related to transfer of data over said tethering connection, and initiating establishment, activation or reactivation of said primary communication channel in response to receiving, via said secondary communication channel, a request to access a resource in a remote network over said tethering connection using a mobile access point functionality provided by the first mobile device. The method may further comprise initiating downloading of said resource to a local proxy in response to receiving the request to access the resource, thereby downloading at least part of said resource to the local proxy before completion of the establishment, activation or reactivation of the primary communication channel.

According to another example embodiment, a method is provided, the method comprising transmitting, by a first mobile device over a secondary communication channel between the first mobile device and a second mobile device, control information related to a tethering connection provided over a primary communication channel between the first and second mobile devices, wherein in the control information comprises a request to access a resource in a remote network over said tethering connection using a mobile access point functionality provided by the second mobile device, said request comprising an address identifying said resource and said request arranged to cause the second mobile device to initiate establishment, activation or reactivation of said primary communication channel.

According to another example embodiment, a computer program is provided, the computer program including one or more sequences of one or more instructions which, when executed by one or more processors, cause a wireless communication apparatus at least to receive, over a secondary communication channel between the apparatus and a mobile device, control information related to a tethering connection provided over a primary communication channel between the apparatus and the mobile device, wherein said control information comprises one or more requests related to transfer of data over said tethering connection, to initiate establishment, activation or reactivation of said primary communication channel in response to receiving, via said secondary communication channel, a request to access a resource in a remote network over said tethering connection using a mobile access point functionality provided by the apparatus, and, optionally, to initiate downloading said resource to a local proxy in response to receiving said request, thereby downloading at least part of said resource to the local proxy before completion of the establishment, activation or reactivation of the primary communication channel.

According to another example embodiment, a computer program is provided, the computer program including one or more sequences of one or more instructions which, when executed by one or more processors, cause a wireless communication apparatus at least to transmit, over a secondary communication channel between the apparatus and a mobile device, control information related to a tethering connection provided over a primary communication channel between the apparatus and the mobile device, wherein in the control information comprises a request to access a resource in a remote network over said tethering connection using a mobile access point functionality provided by the mobile device, said request comprising an address identifying said resource and said request arranged to cause the mobile device to initiate establishment, activation or reactivation of said primary communication channel.

The computer programs referred to above may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the respective computer program according to an example embodiment of the invention.

The exemplifying embodiments of the invention presented in this patent application are not to be interpreted to pose limitations to the applicability of the appended claims.

The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

A first mobile device provided with means for short-range wireless communication, such as WLAN, and means for wide area wireless communication, such as GSM, UMTS, LTE, may be configured to operate as an access point that enables network access for one or more second mobile devices that are provided with (corresponding) means for short-range wireless communication. In such an arrangement the first mobile device establishes a first connection to a network using the means for wide area wireless communication and a second connection to a second mobile device using the means for short-range wireless communication. Consequently, the first and second connections jointly enable the second mobile device to have access to the network via the first mobile device also/even in conditions and/or environments where the second mobile device is not able to directly connect to the network. To enable the network access, the first mobile device is provided with a functionality that, when activated, among other things, causes the first mobile device to relay information received from the network to the second mobile device and to relay information received from the second mobile device to the network. Such functionality may be referred to as mobile access point functionality. An example use case for application of the mobile access point functionality is a scenario/environment where the second mobile device has no other means for connecting the network and where the direct network access using the means for short-range wireless communication to directly access the network e.g. due to unavailability of fixed wireless access points. Alternatively or additionally, the mobile access point functionality may be useful to enable power savings in the second mobile device by not connecting the network directly.

Such an arrangement where the second mobile device is connected to the first mobile device may be referred to as tethering. While such a tethering connection between two devices may be provided for various purposes, herein the tethering connection is provided to enable the second mobile device to make use of the mobile access point functionality provided by the first mobile device in order to access the network. Thus, the first mobile device may serve as a router for the second mobile device. In the network's point of view the tethering may be seen as the first mobile device accessing the network, although the actual client may be the second mobile device. In this regard, the first mobile device providing the mobile access point functionality may be referred to as a tethering device, whereas the second mobile device accessing the network via the mobile access point functionality may be referred to as a tethering client. Moreover, in case the communication link between the first and second mobile devices is provided using WLAN (e.g. Wi-Fi) technology, the mobile access point functionality may be referred to as a mobile hotspot (and/or the first device providing the functionality may be referred to as a mobile hotspot device).

While in the example described above the tethering device applies wide area wireless communication to establish the connection to the network, a different access technology may be employed instead. As an example in this regard, the connection to the network may be provided via a wired connection, such as a digital subscriber line (DSL). This may be applicable e.g. in a domestic environment where a user device serving as the tethering device applies a fixed network connection whereas the tethering client is not capable of directly employing the wired connection to the network. As another example in this regard, the connection to the network may be provided via a short-range wireless technology that provides a sufficient bandwidth, such as WLAN (e.g. Wi-Fi) technology. This may be applicable e.g. in an environment or a scenario where a user device serving as the tethering device has access to the network via a WLAN (e.g. Wi-Fi) access point while the tethering client is not authorized to connect directly via the wireless access point or direct network access via the wireless access point is not possible e.g. due to capacity issues.

Figure 1A:
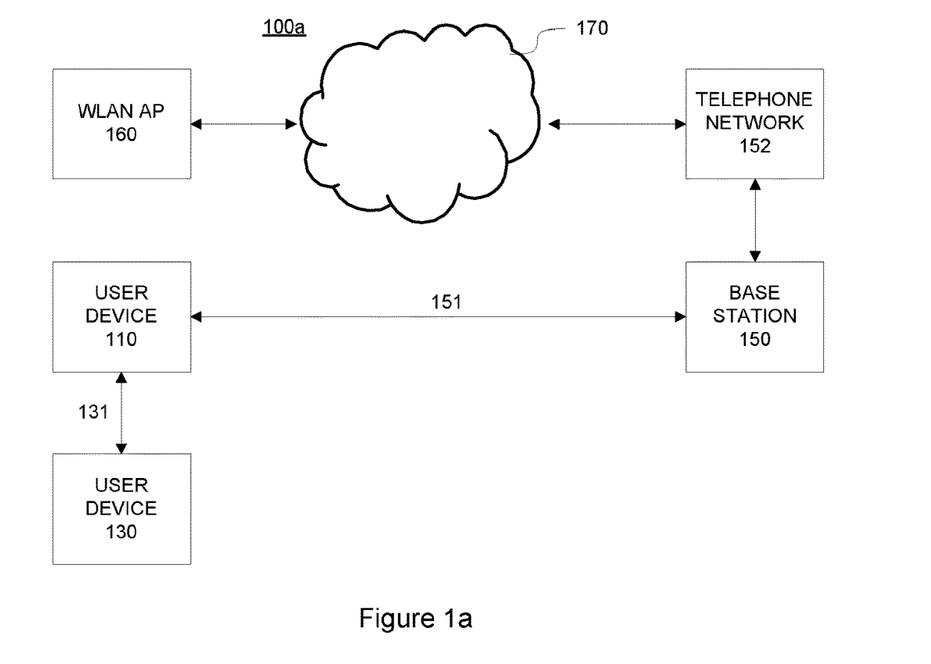
FIG. 1a schematically illustrates some components or entities of a wireless communication arrangement to depict an exemplifying use case for an example embodiment.

FIG. 1a schematically illustrates some components or entities of a wireless communication arrangement 100a to depict an exemplifying use case for various embodiments of the present invention. The wireless communication arrangement 100a depicts a first mobile device 110 and a second mobile device 130. The first mobile device 110 is a user device that is capable of communicating with the cellular base station 150 by using a cellular communication technology such as GSM, GERAN, UTRAN, CDMA2000, LTE, EV-DO, etc. The cellular base station 150 is connected via a telephone network 152 (and possibly via further networks and/or one or more intermediate entities) to a network 170, which may be e.g. the Internet. Hence, the first mobile device 110 is able to access the network 170 via a wireless connection 151 between itself and the cellular base station 150.

The second mobile device 130 is a user device that is capable of communicating with the first mobile device 110 by using a short-range wireless communication technology such as WLAN (e.g. Wi-Fi). The second mobile device 130 is hence capable of establishing a wireless connection 131 between itself and the first mobile device 110 for exchange of information therebetween. The first mobile device 110 is provided with the mobile access point functionality and is hence capable of serving as a tethering device to enable the second device 130 connected to the first device 110 by the wireless connection 131 to have access the network 170 via the wireless connection 151. Consequently, the second mobile device 130 may act as a tethering client and the connection 131 or part thereof may be employed as the tethering connection.

Figure 1B:
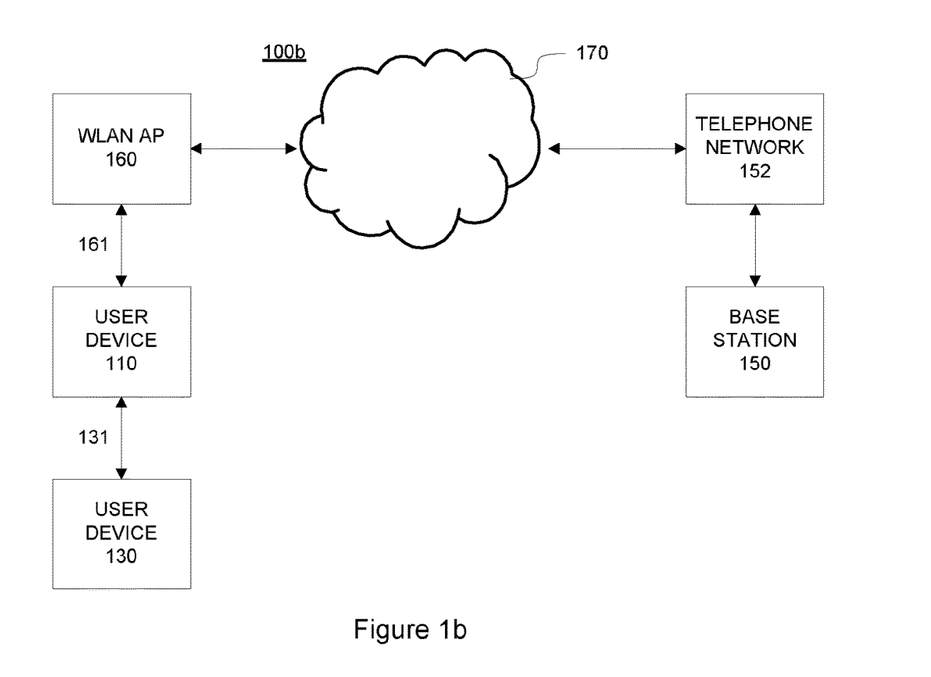
FIG. 1b schematically illustrates some components or entities of a wireless communication arrangement to depict an exemplifying use case for an example embodiment.

FIG. 1b schematically illustrates some components or entities of a wireless communication arrangement 100b to depict another exemplifying use case for various embodiments of the present invention. The wireless communication arrangement 100b is a variation of the wireless communication arrangement 100a, where the wireless connection between the first mobile device 110 (the tethering device) and the network 170 is provided using a wireless local area network (WLAN) technology (e.g. Wi-Fi) instead of cellular access. In this regard, the arrangement 100b comprises a WLAN access point 160, which is connected to the network 170 (typically via further networks and/or one or more intermediate entities). Hence, the first mobile device 110 is able to access the network 170 via a wireless connection 161 between itself and the WLAN access point 160. Consequently, in the framework of the wireless communication arrangement 100b the first mobile device 110 serving as the tethering device provides the network access for the tethering client 130 via the wireless connection 161.

The above-described communication arrangements 100a and 100b serve as non-limiting examples, and the connection to the network 170 may be provided using any suitable access technology that enables sufficient bandwidth. As an example, as briefly mentioned hereinbefore, the connection between the first mobile device 110 (that may serve as the tethering device) and the network 170 may be provided by a fixed network connection (e.g. by using DSL technology)—and hence the connection between the first mobile device 110 and the network 170 does not necessarily involve a wireless connection. As another example, the connection from the first mobile device 110 to the network 170 may be provided using a different wireless technology, e.g. by wireless universal serial bus (wireless USB).

The second mobile device 130 accessing the network 170 may comprise the second mobile device 130 retrieving information from a (server) device connected to the network 170. Examples of information retrieval from a (server) device connected to the network 170 include retrieving a webpage or downloading a file or a document available at the (server) device. As a further example, the second mobile device 130 accessing the network 170 may comprise the second mobile device 130 accessing a service available at or via a (server) device connected to the network 170, e.g. by executing a program or a script available at the (server) device connected to the network 170. As a further example, the second mobile device 130 accessing the network 170 may comprise the second mobile device 130 exchanging information with another device connected to the network 170, e.g. with another mobile device connected to the network by using a cellular technology (via the cellular base station 150 or another base station), by using a WLAN technology (e.g. via the wireless access point 160 or another wireless access point) or by using another suitable access technology.

As a non-limiting example, the data between (a resource in) the network 170 and the second mobile device 130 may be carried using the Internet Protocol (IP), specified e.g. in RFC 791, as the communications protocol (in the Internet layer). Consequently, the first mobile device 110 may be configured to forward (e.g. route) IP packets originating from the network 170 to the second mobile device 130 and vice versa. In such an arrangement the wireless connection 131 between the first mobile device 110 and the second mobile device 130 (conceptually) comprises an IP-based communication channel. As another example, the data transfer from (the resource in) the network and the first mobile device 110 may take place using the IP, whereas a different communications protocol is applied for data transfer in the wireless connection 131 between the first mobile device 110 and the second mobile device 130. In such an arrangement the IP packets are terminated in and/or originate from the first mobile device 110 and the first mobile device 110 is arranged to provide translation between the IP and the communications protocol applied for data transfer over the wireless communication channel 131.

Figure 2:
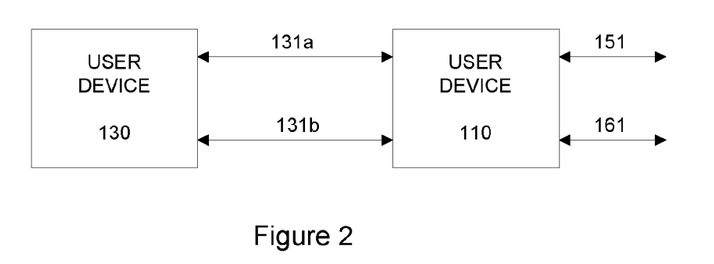
FIG. 2 schematically illustrates a primary and secondary communication channels between two mobile user devices according to an example embodiment.

Although depicted in context of the communication arrangements 100a and 100b as a single connection, the wireless connection 131 between the first mobile device 110 and the second mobile device 130 may comprise at least a primary communication channel 131a and a secondary communication channel 131b, as schematically illustrated in FIG. 2. The primary communication channel 131a is provided for transfer of data and control information between the first mobile device 110 and the second mobile device 130, whereas the secondary communication channel 131b is provided for transfer of (further) control information between the first mobile device 110 and the second mobile device 130. The secondary communication channel 131b is intended for transfer of additional control information to facilitate efficient transfer of data over the primary communication channel 131a. Communication over the primary communication channel 131a may be referred to as in-band communication while communication over the secondary communication channel 131b may be referred to as out-of-band communication. The primary communication channel 131a and the secondary communication channel 131b are typically, but not necessarily, provided as physically separate channels employing separate communication mediums and/or employing different communication technologies or protocols.

Figure 3:
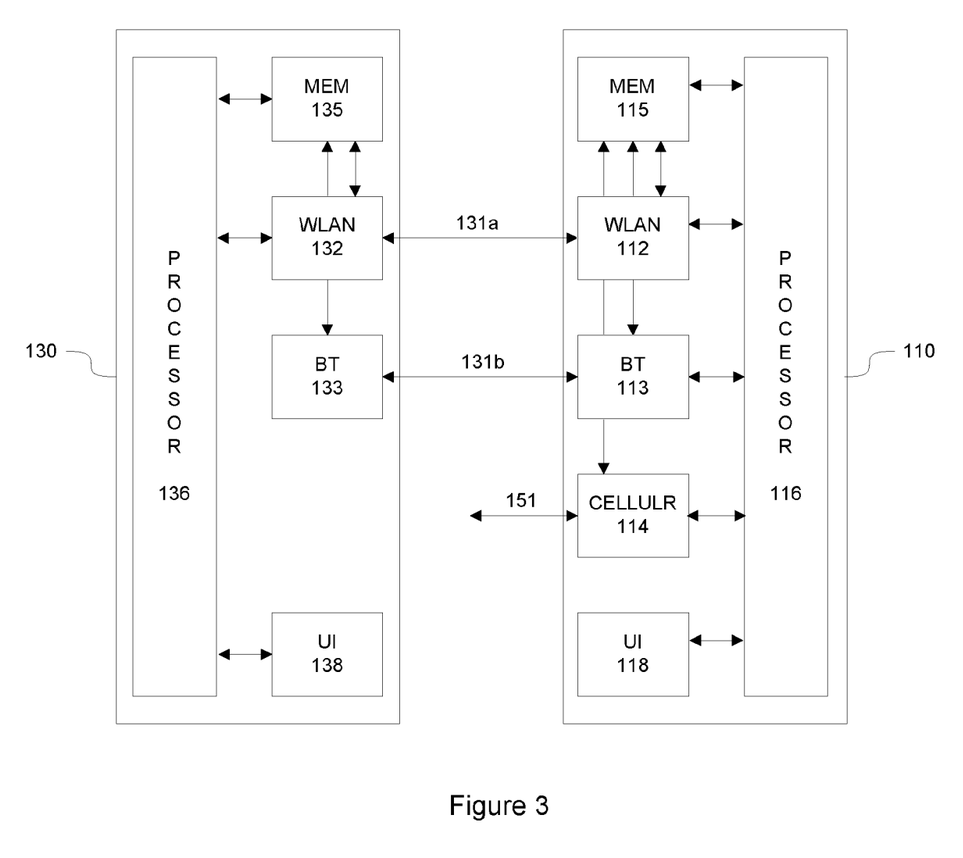
FIG. 3 schematically illustrates some components of exemplifying mobile user devices according to some example embodiments.

FIG. 3 schematically illustrates some components of an exemplifying first mobile device 110 and an exemplifying mobile device 130. The first mobile device 110 comprises a WLAN communication 112 portion for local area wireless communication with other devices, a Bluetooth (BT) communication portion 113 for short-range wireless communication with other devices and a cellular communication portion 114 for wireless cellular communication. The second mobile device 130 comprises a WLAN communication portion 132 for local area wireless communication with other devices and a BT communication portion 133 for short-range wireless communication with other devices.

The first mobile device 110 further comprises a processor 116, a memory 115 for storing data and program code, and a user interface 118 for receiving input from a user and/or providing output to the user of the first mobile device 110. The processor 116 may be arranged to control operation of the first mobile device 110, e.g. in accordance with the program code stored in the memory 115 and further in accordance with the user input received via the user interface 118. In other words, the memory 115 and the program code stored therein may be arranged to, with the processor 116, to control operation of the first mobile device 110. In this regard, the memory 115, the program code stored therein and the processor 116 may be arranged, to control operation of one or more of the WLAN communication portion 112, the BT communication portion 113 and the cellular communication portion 114, either in full or in co-operation with a control portion that may be provided within the respective communication portion 112, 113, 114. The first mobile device 110 may comprise further components or portions in addition to those depicted in FIG. 3.

The second mobile device 130 further comprises a processor 136, a memory 135 for storing data and program code, and a user interface 138 for receiving input from a user and/or providing output to the user of the second mobile device 130. The processor 136 may be arranged to control operation of the second mobile device 130, e.g. in accordance with the program code stored in the memory 135 and further in accordance with the user input received via the user interface 138. In other words, the memory 135 and the program code stored therein may be arranged to, with the processor 136, to control operation of the second mobile device 130. In this regard, the memory 135, the program code stored therein and the processor 136 may be arranged, to control operation of the WLAN communication portion 132 and/or the BT communication portion 133, either in full or in co-operation with a control portion that may be provided within the respective communication portion 132, 133. The mobile device 130 may comprise further components or portions in addition to those depicted in FIG. 3.

Each of the wireless communication portions 112, 113, 114, 132, 133 may be provided e.g. as a respective chipset and/or as a respective communication module. For clarity and brevity of description, each of the wireless communication portions 112, 113, 114, 132, 133 is considered as a single logical portion that is also able to process the information received via the wireless connection and/or that is to be transmitted via the wireless connection and that is able to exchange data and control information with other entities or components of the respective mobile device 110, 130 hosting the respective wireless communication portion 112, 113, 114, 132, 133. In this regard, each of the wireless communication portions 112, 113, 114, 132, 133 may comprise e.g. a wireless transceiver portion for wireless communication with other devices, a host interface for exchanging data and control information with other components or entities of the respective mobile device 110, 130 (e.g. the processor 116, 136) and a control portion for processing information received/transmitted via the wireless transceiver portion. Such a control portion may be provided by hardware means, by software means or by combination of hardware means and software means. The communication portion 112, 113, 114, 132, 133 may further comprise e.g. a memory for storing information. As an example, the control portion may be provided e.g. as a processor and the memory may include a computer program code, and the memory and the computer program code may be configured to, with the processor, control operation of the respective wireless communication portion 112, 113, 114, 132, 133, possibly together with the processor 116, 136 of the respective mobile device 110, 130.

FIG. 3 further depicts the primary communication channel 131a as a channel between the WLAN communication portions 112 and 132 and the secondary communication channel 131b as a channel between the BT communication portions 113 and 133. Moreover, the communication channel 151 between the cellular communication portion 114 of the mobile device 110 and the cellular base station 150 is applied to provide the connection to the network 170. Alternatively, instead of making use of cellular communication (and hence the connection 151) in order to access the network 170, the first mobile device 110 may be configured to employ e.g. WLAN communication to provide access to the network 170. In this regard, the first mobile device 110 may comprise a further WLAN communication portion for accessing the network 170 via the WLAN access point 160 or the WLAN communication portion 112 of the first mobile device 110 may be employed to (also) provide the connection 161 to the WLAN access point 160 and hence provide access to the network 170. In such an approach it is not necessary for the first mobile device 110 to include the cellular communication portion 114.

The first mobile device 110 is arranged to provide a mobile access point functionality for providing access to the network 170 (e.g. via the wireless connection 151 or the wireless connection 161) for the mobile device 130 and/or further user devices. The mobile devices 110 and 130 are arranged to provide a tethering connection therebetween. In particular, the first mobile device 110 may be arranged to operate as the tethering device (that provides and/or controls the tethering connection), whereas the second mobile device 130 is arranged to operate as the tethering client. Hence, in the following, the first mobile device 110 may be referred to as the tethering device 110 and the second mobile device 130 may be referred to as the tethering client 130.

As described hereinbefore, the secondary communication channel 131b is mainly provided for (out-of-band) transfer of control information between the tethering device 110 and the tethering client 130 in order to facilitate efficient transfer of information over the tethering connection that is provided over the primary communication channel 131a. The control information transferred over the secondary communication channel 131b may comprise, for example, one or more requests, messages and/or indications related to transfer of data over the tethering connection. These may include e.g. request(s) for initiating and/or carrying out data transfer over the tethering connection, message(s) or indication(s) related to the status or availability of the tethering connection and/or message(s) or indication(s) related to the status or availability of one or more processes related to the tethering connection.

As an example, the tethering device 110 or the tethering client 130 may be configured to establish the secondary communication channel 131b upon establishing, activating or reactivating the primary communication channel 131a for the tethering connection. Alternatively, the secondary communication channel 131b may be established or activated prior to establishment of the primary communication channel 131a and information transferred over the secondary communication channel 131b may be applied to initiate establishment, activation or reactivation of the primary communication channel 131a. The secondary communication channel 131b may be employed for transfer of control information that enables controlling power saving features in context of tethering connection provided via the primary communication channel 131a. As an example, such control information may comprise information that causes setting the mobile access point functionality in the tethering device 110 into an idle state (or a stand-by state) when there is no information to be relayed from the tethering client 130 towards the network 170 (e.g. via the cellular base station 150 using the connection 151 or via the WLAN access point 160 using the connection 161) or from the network 170 to the tethering client 130. As another example, such control information may comprise information that enables optimizing activity times in the tethering connection provided via the primary communication channel 131a. An example of such an arrangement for using an out-of-band channel to control features that facilitate energy efficient data transfer of the primary communication channel is described in a co-pending U.S. patent application Ser. No. 13/746,717, incorporated herein by reference in its entirety.

The tethering client 130 may be configured to send a request to access a resource in the network 170, serving as a request for establishing, activating or reactivating the tethering connection to the tethering device 110, in response to a user of the tethering client 130 invoking an action that requires accessing the resource in the network 170. As an example, such a user action may comprise the user of the tethering client 130 invoking an action that results in a webpage, a document or a file to be downloaded from a server in the network 170 (e.g. by clicking or selecting a link thereto via the user interface 138 when operating a browser application). Hence, accessing the resource may comprise the tethering client 130 accessing e.g. a webpage, a document or a file by retrieving (e.g. downloading) the content thereof for presentation to the user via the user interface 138.

The request to access the resource is transmitted over the secondary communication channel 131b (e.g. via the BT communication portion 133). In case the secondary communication channel 131b is not already created, the secondary communication channel 131b with the tethering device 110 is established prior to transmission of the request. In case the secondary communication channel 131b is already established but is currently in an inactive state (e.g. in an idle state or a low-power mode), the secondary communication channel is activated or reactivated to enable transmission of the request.

The request may comprise an address of the resource (e.g. an address of a requested webpage, an address of a requested document, an address of a requested file, etc.) the user of the tethering client 130 wishes to access. Alternatively, the address of the resource may be provided in a separate message or request, transmitted via the secondary communication channel 131b e.g. immediately or essentially immediately following the transmission of the request for establishing or activating the tethering connection. The address of the resource may be provided e.g. as a domain name (e.g. www.example.org) or as a uniform resource identifier (URI), e.g. as a uniform resource locator (URL) (e.g. www.example.org/resource.pdf).

The tethering device 110 may be configured to initiate, in response to a request for establishing, activating or reactivating the tethering connection received from the tethering client 130, activation of necessary operations, processes or functions for providing access to the network 170 by using the mobile access point functionality provided in the tethering device 110. These operations, processes or functions may include activation or reactivation of the mobile access point functionality in the tethering device 110, establishment, activation or reactivation of the primary communication channel 131a and/or establishment activation or reactivation of the network connection (e.g. the wireless connection 151, 161 or another applicable connection to the network 170). Hence, the request for the tethering connection may invoke a number of operations to be carried out in the tethering device 110 and/or signaling exchange between the tethering device 110 and one or more external entities. Consequently, these operations carried out or initiated by the tethering device 110 as part of the setup phase of the mobile access point functionality, setup phase of the tethering connection and/or the setup phase of the network connection may incur a delay that may be up to several seconds before the data transfer via the primary communication channel 131a and/or the network connection via the mobile access point functionality provided by the tethering device 110 are possible.

As an example in this regard, the first request to access the resource received via the secondary communication channel 131b may require activating and/or setting up the mobile access point functionality for the tethering client 110, establishment of the primary communication channel 131 for use as the tethering connection, and possibly also establishment, activation or reactivation the connection to the network 170 (e.g. the wireless connection 151, the wireless connection 161 or other connection available for accessing the network 170). As another example, the mobile access point functionality and/or the primary communication channel 131a may have been set to an idle state or an inactive state as a power saving measure after a period of inactivity in the primary communication channel 131a. Consequently, a subsequent request to access the resource received via the secondary communication channel 131b received when the mobile access point functionality and/or the primary communication channel 131a are in the idle/inactive state may require activation or reactivation before the connection to the network 170 and/or the tethering connection are available. Moreover, also the connection between the tethering device 110 and the network 170 (e.g. the wireless connection 151, the wireless connection 161 or other connection available for accessing the network 170) may be in an idle/inactive state and require activation or reactivation before access to the network 170 via the mobile access point functionality is available.

In order to facilitate the tethering client 130 accessing the requested resource with as small delay as possible, the tethering device 110 may be configured to commence downloading the resource during setup phase of the mobile access point functionality and/or during setup phase of the tethering connection over the primary communication channel 131a, in other words in parallel with activation of the mobile access point functionality and/or activation of the tethering connection. In this regard, the tethering device 110 may be configured to initiate downloading the resource to a local proxy in response to receiving the request to establish/activate/reactivate the tethering connection from the tethering client 130. The local proxy may be provided in the tethering device 110 to cache information received/downloaded from the requested resource(s) in the network 170. The local proxy may be applied to cache information also for other tethering clients possibly served by the mobile access point functionality provided by the tethering device 110. As further examples, the local proxy may be provided in a device separate from the tethering device, e.g. in the WLAN access point 160 (or in a server connected thereto) or in the base station 150 (or in a server connected thereto). The local proxy may be arranged to provide information to the client device 130 as soon as communication channel 131a is established.

The tethering device 110 may be configured to send a message serving as an indication regarding the initiation of downloading the requested resource to the local proxy once the downloading has been initiated. This message may at the same time serve as an acknowledgement or indication regarding initiation of establishment, activation or reactivation of the tethering connection. The message may be transmitted via the secondary communication channel 131b. Alternatively, a separate message indicating the initiation of establishment, activation or reactivation of the tethering connection may be transmitted via the secondary communication channel 131b. The message indicating the initiation of the downloading may comprise an indication of the estimated time required to download the resource to the local proxy.

The tethering device 110 may be configured to transmit a message comprising information that indicates completion of the establishment, activation or reactivation of the tethering connection, in other words indicates availability of the tethering connection for transfer of data. The message may be transmitted over the secondary communication channel 131b. The message indicating the availability of the tethering connection may also serve as an indication regarding the mobile access point functionality being in an active state. Alternatively, the tethering device 110 may be configured to send a separate message indicating the mobile access point functionality being in the active state. The message indicating the availability of the tethering connection and/or the message indicating the active state of the mobile access point functionality may comprise the address of the local proxy. Alternatively, the local proxy address may be provided in a separate message over the secondary communication channel 131b. Consequently, the tethering client 130 may start downloading the resource from the local proxy in response to receiving the indication regarding availability of the tethering connection or in response to receiving the indication regarding the active state of the mobile access point functionality.

The downloading of the resource to the local proxy is, typically, independent of the establishment, activation or reactivation of the tethering connection between the tethering device 110 and the tethering client 130 and/or the activation/reactivation process of the mobile access point functionality. Consequently, the resource may or may not be available in full upon availability of the tethering connection and/or mobile access point functionality—or upon the tethering client 130 receiving the indication(s) in this regard. The tethering device 110 may be further configured to transmit a further message comprising an indication that the downloading of the resource to the local proxy is completed, in other words an indication regarding the resource being available in the local proxy in full. The message may be transmitted via the secondary communication channel 131b. Consequently, the tethering client 130 may be configured to start downloading the resource from the local proxy in response to receiving the indication regarding availability of the resource in the local proxy.

As described hereinbefore, the primary communication channel 131a is provided for transfer of data, and hence the downloading of the resource from the local proxy typically comprises downloading the resource over the primary communication channel 131a. However, in case the tethering client receives the indication regarding availability of the resource in the local proxy is received before the indication regarding availability of the tethering connection (e.g. before availability of the primary communication channel 131a for transfer of data), the tethering client 130 may be configured to download the resource via the secondary communication channel 131b. In case the downloading has been started over the secondary communication channel 131a and the indication regarding availability of the tethering connection is received before the downloading is complete, the tethering client may be configured to change or switch downloading (the remainder of) the resource over the primary communication channel 131a in response to receiving the indication regarding availability of the tethering connection.

The tethering client 130 may be configured to send a request to receive indication(s) regarding subsequent changes in content of the requested resource after the resource has been downloaded to the local proxy in full. This request may be transmitted via the secondary communication channel 131*b*, e.g. immediately following the transmission of the request for the tethering connection, following the indication regarding availability of the tethering connection or following the indication regarding availability of the requested resource in the local proxy. The tethering device 110 may request the local proxy to provide the tethering client 130 with an indication regarding updated content of the resource. Once updated content of the requested resource is available in the local proxy, an indication regarding availability of an updated version of the requested resource is provided to the tethering client over the secondary communication channel 131*b*. In case the local proxy is provided in a device separate from the tethering device 110, the indication may be received via the tethering device 110, which is configured to forward the indication to the tethering client 130 in a message transmitted via the secondary communication channel 131*b*. Consequently, the tethering client 130 may be configured to start downloading the updated resource from the local proxy in response receiving the indication regarding updated content.

There are various techniques or protocols that may be employed for conveying the messages over the secondary communication channel 131*b*. As a non-limiting example in this regard, when employing e.g. the BT protocol (used as an example hereinbefore) or the BLE protocol, the messages may be provided using a Generic Attribute Protocol (GATT) build on top of Attribute Protocol (ATT) and it establishes common operations and a framework for the data transported and stored in accordance with the Attribute Protocol.

GATT defines two roles, a Server and a Client. A GATT server stores the data transported over the Attribute Protocol and accepts Attribute Protocol requests, commands and confirmations from a GATT client. The GATT server sends responses to requests and the GATT server may be configured to send indication and notifications asynchronously to the GATT client when specified events occur on the GATT server. For example the following data or message types may be applied within the framework of GATT.

Notification: An unsolicited protocol data unit (PDU) sent to a GATT client by a GATT server Indication: An unsolicited PDU sent to a GATT client by a GATT server, intended to invoke a confirmation from the GATT client Confirmation: A PDU sent to a GATT server by a GATT client to confirm reception of an indication received from the GATT server In this framework, the tethering device 110 may serve as a GATT client that receives notifications and/or indications from the tethering client 130 serving as a GATT server. When the tethering client 130 requires access to a resource in the network 170 via the tethering device 110, the tethering client 130 may be configured to send the request for establishing, activating or reactivating the tethering connection as a notification or an indication according to GATT that comprises identification (e.g. the URL or an address of other type) of the requested resource. As another example, the identification of the requested resource may be provided from the tethering client 130 (e.g. read or requested by the tethering device 110 serving as the GATT client) in a separate message (e.g. notification) after provision of the request for establishing, activating or reactivating the tethering connection. The tethering device 110 may be configured to send e.g. the message addressed to the tethering client 130, e.g. the message indicating initiation of the tethering connection establishment, activation or reactivation or the message indicating the local proxy address, as confirmations according to GATT.

Figure 4:
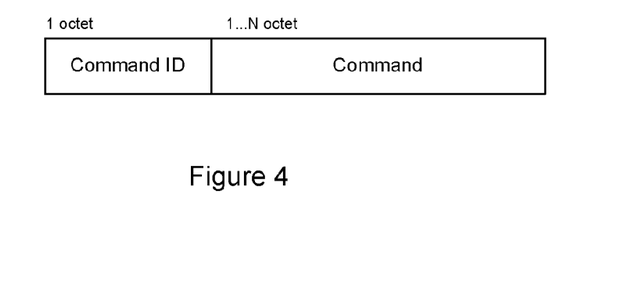
FIG. 4 schematically illustrates a control packet structure according to an example embodiment.

A notification, an indication or a confirmation according to GATT may apply a control packet comprising a command ID field and a command field, as depicted in FIG. 4. As an example, the control signaling over the secondary communication channel 131*b* may employ e.g. the following control packets.

| Command ID | Purpose | Command | Origin |
|---|---|---|---|
| 1 | Requested webpage | http://www.page.com | GATT server |
| 2 | Requested file | http://www.page.com/example.pdf | GATT server |
| 3 | Tethering connection available | local proxy address = 192.168.0.102 | GATT client |
| 4 | Downloading started | Status = OK, estimated time = 10 s | GATT client |

Although described in the foregoing by using WLAN as an exemplifying communication technology for providing the primary communication channel 131*a*, another short-range wireless communication technology or protocol that provides a sufficient bandwidth may be applied instead, such as the Bluetooth basic rate (BR) mode or the Bluetooth enhanced data rate (EDR) mode, both described e.g. in the Bluetooth Specification Version 4.0, Specification Volume 3—Core System Package [Host volume] Part C, Section 11 (publication date 30 Jun. 2010). In case a tethering connection providing relatively low data rate is sufficient, for example the Bluetooth Low Energy (BLE) protocol, also described e.g. in the Bluetooth Specification Version 4.0, Specification Volume 3—Core System Package [Host volume] Part C, Section 11 (publication date 30 Jun. 2010), or the ZigBee protocol (IEEE 802.15.4, IEEE 802.15.4a) may be applied to provide the primary communication channel 131*a*.

Moreover, although described in the foregoing by using the Bluetooth protocol in general (e.g. the Bluetooth BR or the Bluetooth EDR) as an exemplifying communication technology for providing the secondary communication channel 131*b*, another short-range wireless communication technology or protocol that enables lightweight and/or fast connection set-up (in comparison to the technology/protocol applied to provide the primary communication channel 131*a* and/or in comparison of the setup time of the mobile access point functionality in the tethering device 110) may be applied instead. As an example, the BLE protocol may be applied. Further examples of techniques/protocols suitable for providing the secondary communication channel 131*b* include the ZigBee protocol and the NFC technology.

Figure 5:
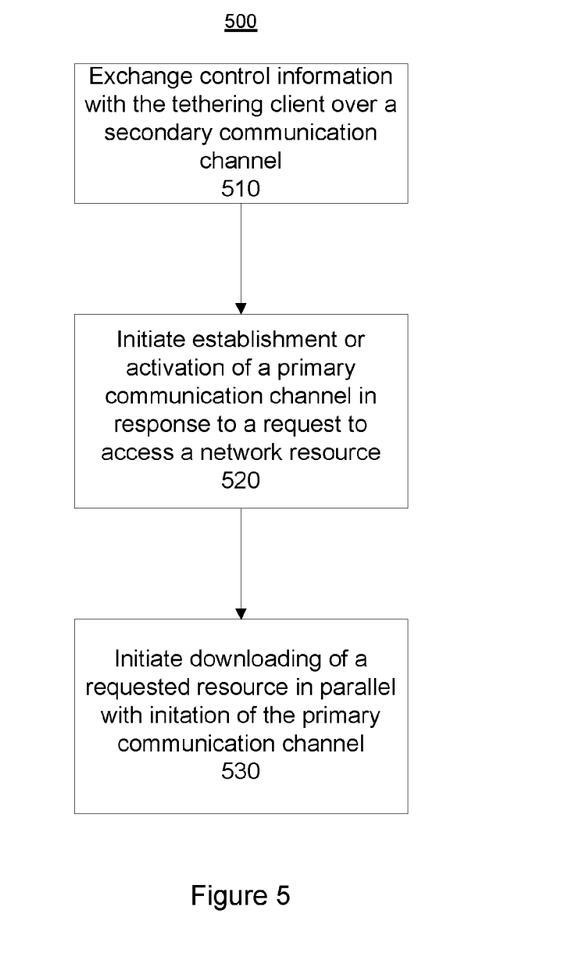
FIG. 5 illustrates a method according to an example embodiment.
Figure 6:
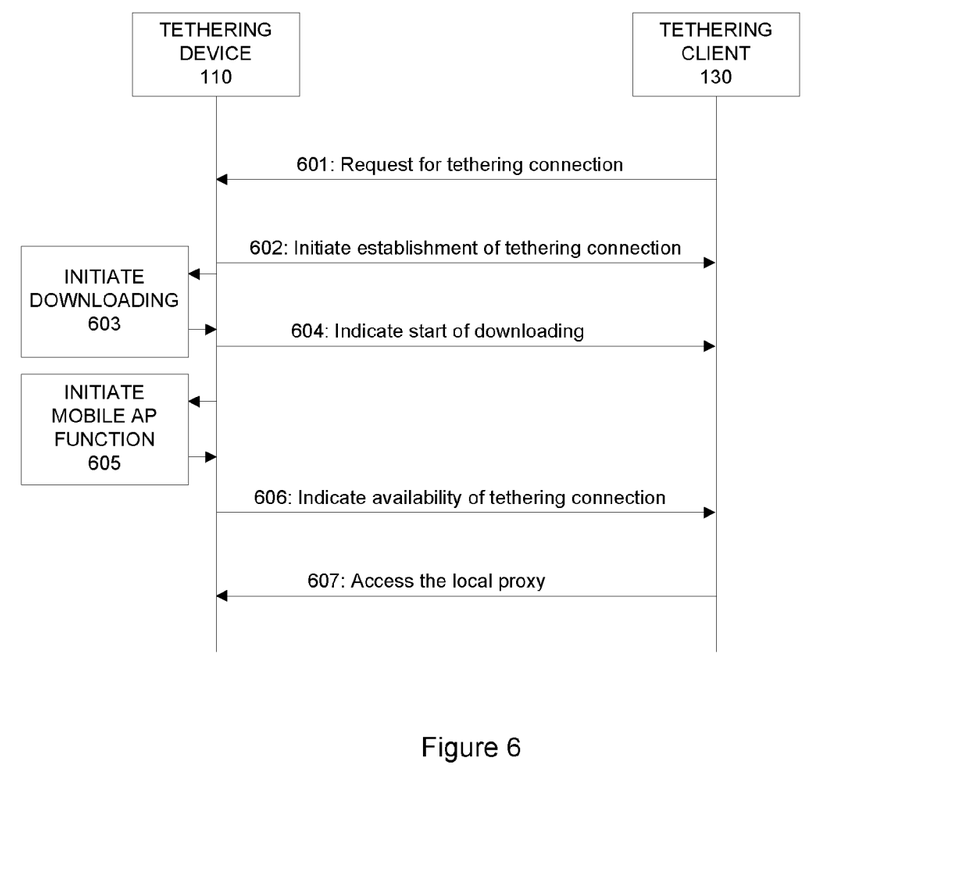
FIG. 6 illustrates signaling exchange according to an example embodiment.

The flow of operation in activating or re-activating the mobile access point functionality and/or the primary communication channel 131*a* for the tethering connection is further described in context of a method 500 illustrated in the flowchart depicted in FIG. 5 with further references to the signaling chart depicted in FIG. 6. The method 500 commences with exchanging, e.g. receiving, over the secondary communication channel 131*b*, control information related to the tethering connection (to be) provided over the primary communication channel 131*a*, as indicated in block 510. The operation described in block 510 may be preceded by establishing, by the tethering device 110 and/or the tethering client, the secondary communication channel 131b. The establishment of the secondary communication channel 131b may be invoked, for example, by reception of the request for establishing, activating or reactivating the tethering connection received from the tethering client 130 (step 601 in FIG. 6). As described hereinbefore, this request may comprise a request to access a resource in the network 170 or be accompanied by a separate request to access a resource in the network 170, the request to access the resource possibly further comprising an address identifying the resource.

The method 500 continues with initiating establishment, activation or reactivation of the primary communication channel 131 for use as the tethering connection in response to the request to access a resource in the network 170, as indicated in block 520 and in step 602. At the same time or essentially at the same time, the downloading of the requested resource to the local proxy may be initiated, as indicated in step 603. Moreover, at the same time or essentially at the same time the activation or reactivation of the mobile access point functionality may be initiated in case it is not already in the active state (e.g. due to be invoked to serve another tethering client or an earlier request by the tethering client 130), as indicated in step 605. Hence, as described hereinbefore, the downloading the requested resource to the local proxy may be carried out at least in part simultaneously (or in parallel) with the setup process of the tethering connection and/or with the setup process of the mobile access point functionality.

The method 500 may further comprise sending, over the secondary communication channel 131b, the message indicating that the downloading of the requested resource to the local proxy has been started (step 604) and/or sending, over the secondary communication channel 131b, the message indicating availability of the primary communication channel 131a for the tethering connection (step 606). Once the primary communication channel 131a is available for the tethering connection, the tethering client 130 may access the local proxy to start downloading the requested resource, as indicated in step 607.

The method 500 and/or the exemplifying signaling depicted in FIG. 6 may be varied in a number of ways, e.g. in accordance with examples described hereinbefore in context of the operation and structure of the tethering device 110 and the tethering client 130.

Referring back to FIG. 3, the exemplifying first mobile device 110 depicted therein may be considered to provide an exemplifying diagram of components of an apparatus capable of operating as or providing the tethering device 110 according to an example embodiment. The processor 116 is configured to read from and write to the memory 115.

Although the processor 116 is depicted as a single component, the processor 116 may be implemented as one or more separate components. Similarly, although the memory 115 is illustrated as a single component, the memory 115 may be implemented as one or more separate components, some or all of which may be integrated/removable and/or may provide permanent/semi-permanent/dynamic/cached storage.

The memory 115 may store a computer program comprising computer-executable instructions that control the operation of the apparatus 110 when loaded into the processor 116. As an example, the computer program may include one or more sequences of one or more instructions. The computer program may be provided as a computer program code. The processor 116 is able to load and execute the computer program by reading the one or more sequences of one or more instructions included therein from the memory 115. The one or more sequences of one or more instructions may be configured to, when executed by the processor 116, cause the apparatus 110 to carry out operations, procedures and/or functions described hereinbefore in context of the tethering device 110.

Hence, the apparatus 110 may comprise at least one processor 116 and at least one memory 115 including computer program code for one or more programs, the at least one memory 115 and the computer program code configured to, with the at least one processor 116, cause the apparatus 110 to perform operations, procedures and/or functions described hereinbefore in context of the tethering device 110.

The computer program may be provided e.g. as a computer program product comprising at least one computer-readable non-transitory medium having program code stored thereon, the program code, when executed by the apparatus 110, causing the apparatus at least to perform operations, procedures and/or functions described hereinbefore in context of the tethering device 110. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. An apparatus comprising at least one processor and at least one memory including computer program code for one or more programs, the at least one memory and the computer program code configured to, with the at least one processor, cause the apparatus at least to
    receive, over a secondary communication channel between the apparatus and a mobile device, control information related to a tethering connection provided over a primary communication channel between the apparatus and the mobile device, wherein said control information comprises one or more requests related to transfer of data over said tethering connection including a request to access a resource in a remote network over said tethering connection using a mobile access point functionality provided by the apparatus and an address identifying said resource in the remote network,
    initiate establishment, activation or reactivation of said primary communication channel in response to receiving, via said secondary communication channel, the request, and
    initiate downloading said resource to a local proxy in response to receiving said request, and download at least part of said resource to the local proxy before completion of the initiated establishment, activation or reactivation of the primary communication channel.

2. An apparatus according to claim 1, wherein the apparatus is further caused to provide said local proxy for caching information received from the remote network.

3. An apparatus according to claim 1, further caused to initiate activation or reactivation of the mobile access point functionality in response to receiving said request.

4. An apparatus according to claim 1, further caused to transmit, over said secondary communication channel, a message indicating availability of the tethering connection in response to completion of establishment, activation or reactivation of said primary communication channel.

5. An apparatus according to claim 4, wherein said message indicating availability of the tethering connection comprises an indication of the address of said local proxy.

6. An apparatus according to claim 1, further caused to transmit, over said secondary communication channel, a message indicating availability of the resource in full in response to completion of downloading the resource to said local proxy.

7. An apparatus according to claim 1, wherein said address comprises a universal resource locator, URL, identifying said resource.

8. An apparatus according to claim 1, wherein said primary communication channel is provided by one of the following: a wireless local area network, WLAN, connection, a Bluetooth Basic Rate connection, a Bluetooth Enhanced Data Rate connection, and
wherein said secondary communication channel is provided by one of the following: a Bluetooth Basic Rate connection, a Bluetooth Enhanced Data Rate connection, a Bluetooth Low Energy connection.

9. An apparatus comprising at least one processor and at least one memory including computer program code for one or more programs, the at least one memory and the computer program code configured to, with the at least one processor, cause the apparatus at least to
transmit, over a secondary communication channel between the apparatus and a mobile device, control information related to a tethering connection provided over a primary communication channel between the apparatus and the mobile device,
wherein the control information comprises a request to access a resource in a remote network over said tethering connection using a mobile access point functionality provided by the mobile device, said request comprising an address identifying said resource, said request arranged to cause the mobile device to initiate establishment, activation or reactivation of said primary communication channel and said request further arranged to cause the mobile device to initiate downloading of said resource to a local proxy in response to receiving said request, and download at least part of said resource to the local proxy before completion of an initiated establishment, activation or reactivation of the primary communication channel.

10. An apparatus according to claim 9, further caused to initiate downloading of said resource in response to one of the following
receiving, over the secondary communication channel, a message indicating availability of the tethering connection over said primary communication channel; and
receiving, over the secondary communication channel, a message indicating availability of said resource in full in a local proxy.

11. An apparatus according to claim 1, wherein said address comprises a universal resource locator, URL, identifying said resource.

12. An apparatus according to claim 9, wherein said primary communication channel is provided by one of the following: a wireless local area network, WLAN, connection, a Bluetooth Basic Rate connection, a Bluetooth Enhanced Data Rate connection, and
wherein said secondary communication channel is provided by one of the following: a Bluetooth Basic Rate connection, a Bluetooth Enhanced Data Rate connection, a Bluetooth Low Energy connection.

13. A method comprising:
receiving, by a first mobile device, over a secondary communication channel between the first mobile device and a second mobile device, control information related to a tethering connection provided over a primary communication channel between the first and second mobile devices, wherein said control information comprises one or more requests related to transfer of data over said tethering connection including a request to access a resource in a remote network over said tethering connection using a mobile access point functionality provided by the apparatus and an address identifying said resource in the remote network,
initiating establishment, activation or reactivation of said primary communication channel in response to receiving, via said secondary communication channel, the request, and
initiating downloading of said resource to a local proxy in response to receiving said request, and downloading at least part of said resource to the local proxy before completion of the initiated establishment, activation or reactivation of the primary communication channel.

14. A method according to claim 13, further comprising providing said local proxy for caching information received from the remote network.

15. A method comprising:
transmitting, by a first mobile device over a secondary communication channel between the first mobile device and a second mobile device, control information related to a tethering connection provided over a primary communication channel between the first and second mobile devices,
wherein the control information comprises a request to access a resource in a remote network over said tethering connection using a mobile access point functionality provided by the second mobile device, said request comprising an address identifying said resource, said request arranged to cause the second mobile device to initiate establishment, activation or reactivation of said primary communication channel and said request further arranged to cause the mobile device to initiate downloading of said resource to a local proxy in response to receiving said request, and download at least part of said resource to the local proxy before completion of an initiated establishment, activation or reactivation of the primary communication channel.

16. A computer program product comprising computer executable program code recorded on a computer readable, non-transitory storage medium, the computer executable program code comprising:
code for receiving, by an apparatus, over a secondary communication channel between the apparatus and a mobile device, control information related to a tethering connection provided over a primary communication channel between the apparatus and the mobile device, wherein said control information comprises one or more requests related to transfer of data over said tethering connection including a request to access a resource in a remote network over said tethering connection using a mobile access point functionality provided by the apparatus and an address identifying said resource in the remote network, code for initiating establishment, activation or reactivation of said primary communication channel in response to receiving, via said secondary communication channel, the request, and code for initiating downloading of said resource to a local proxy in response to receiving said request, and downloading at least part of said resource to the local proxy before completion of the initiated establishment, activation or reactivation of the primary communication channel.

17. A computer program product comprising computer executable program code recorded on a computer readable, non-transitory storage medium, the computer executable program code comprising:

code for transmitting, by an apparatus, over a secondary communication channel between the apparatus and a mobile device, control information related to a tethering connection provided over a primary communication channel between the apparatus and the mobile device, wherein the control information comprises a request to access a resource in a remote network over said tethering connection using a mobile access point functionality provided by the mobile device, said request comprising an address identifying said resource, said request arranged to cause the mobile device to initiate establishment, activation or reactivation of said primary communication channel and said request further arranged to cause the mobile device to initiate downloading of said resource to a local proxy in response to receiving said request, and download at least part of said resource to the local proxy before completion of an initiated establishment, activation or reactivation of the primary communication channel.

* * * * *